US012602371B1

(12) United States Patent
Chen

(10) Patent No.: US 12,602,371 B1
(45) Date of Patent: Apr. 14, 2026

(54) ONE-PHASE COMMIT FOR DISTRIBUTED TRANSACTIONS

(71) Applicant: EloqData Inc, Dover, DE (US)

(72) Inventor: Liang Chen, Cupertino, CA (US)

(73) Assignee: EloqData Inc, Dover, DE (US)

( * ) Notice: Subject to any disclaimer, the term of this patent is extended or adjusted under 35 U.S.C. 154(b) by 0 days.

(21) Appl. No.: 19/206,475

(22) Filed: May 13, 2025

(51) Int. Cl.
*G06F 16/23* (2019.01)
*G06F 16/27* (2019.01)

(52) U.S. Cl.
CPC ...... *G06F 16/2379* (2019.01); *G06F 16/2358* (2019.01); *G06F 16/2365* (2019.01); *G06F 16/27* (2019.01)

(58) Field of Classification Search
CPC ............. G06F 16/2379; G06F 16/2358; G06F 16/2365; G06F 16/27
See application file for complete search history.

(56) References Cited

U.S. PATENT DOCUMENTS

| | | | |
|---|---|---|---|
| 6,845,384 B2 | 1/2005 | Bamford et al. | |
| 8,185,493 B2 | 5/2012 | Matsumura | |
| 9,075,841 B2 | 7/2015 | Larson et al. | |
| 9,201,919 B2 | 12/2015 | Little | |
| 9,292,561 B2 | 3/2016 | Mitchell et al. | |
| 9,305,047 B2 | 4/2016 | Little | |
| 9,384,229 B2 | 7/2016 | Mitchell et al. | |
| 9,501,312 B2 | 11/2016 | Little | |
| 9,892,152 B2 | 2/2018 | Mitchell et al. | |
| 10,095,730 B1 | 10/2018 | Hoffmann et al. | |
| 10,114,837 B2 | 10/2018 | Larson et al. | |
| 10,203,981 B2 | 2/2019 | Little | |
| 10,430,402 B2 | 10/2019 | Little | |
| 10,452,640 B2 | 10/2019 | Lee et al. | |
| 10,474,493 B2 | 11/2019 | Little | |
| 11,379,464 B2 | 7/2022 | Meneghetti et al. | |
| 11,429,599 B2 | 8/2022 | Han et al. | |
| 11,675,778 B2 | 6/2023 | Schreter | |
| 11,921,701 B2 | 3/2024 | Zhang et al. | |
| 2008/0235245 A1 | 9/2008 | Huras et al. | |
| 2009/0217274 A1* | 8/2009 | Corbin | G06F 9/466 718/101 |
| 2009/0292744 A1* | 11/2009 | Matsumura | G06F 16/27 |

(Continued)

FOREIGN PATENT DOCUMENTS

EP          3924823          8/2020

*Primary Examiner* — Robert W Beausoliel, Jr.
*Assistant Examiner* — Mohammad S Bhuyan
(74) *Attorney, Agent, or Firm* — Treasure IP Group, LLC

(57) ABSTRACT

The present disclosure relates to one-phase commit (1PC) for distributed transactions. A method, computer storage medium, and system are provided for one-phase commit. In one embodiment, the method comprises determining, based on the result of a logging operation that occurs at a global log, whether all of a plurality of nodes are ready to proceed with a commit decision; and communicating a commit decision to the plurality of transaction participants if all of the plurality of nodes are ready, or, communicating an abort decision to the plurality of transaction participants if any of the plurality of nodes is not ready. The transaction coordinator (Tx) communicates with the global log (Txlog) to ensure that transactions are committed or aborted atomically, to achieves high availability and performance, especially for distributed database environments.

20 Claims, 6 Drawing Sheets

200

(56)     References Cited

U.S. PATENT DOCUMENTS

| 2015/0227574 | A1* | 8/2015 | Little | G06F 16/1865 |
| | | | | 707/703 |
| 2016/0210322 | A1* | 7/2016 | Little | G06F 9/466 |
| 2020/0183951 | A1* | 6/2020 | Mittal | G06F 16/2237 |
| 2022/0284011 | A1 | 9/2022 | Qian et al. | |
| 2023/0297478 | A1* | 9/2023 | Zhou | G06F 11/1451 |
| | | | | 707/645 |
| 2024/0211488 | A1 | 6/2024 | Han et al. | |

* cited by examiner

ONE-PHASE COMMIT FOR DISTRIBUTED TRANSACTIONS

TECHNICAL FIELD

The present disclosure relates to the technical field of data processing in a distributed transaction system, and more particularly, to one-phase commit for distributed transactions.

BACKGROUND

ACID (an abbreviation of the ACID standard: Atomicity, Consistency, Isolation, Durability)-compliant transaction processing is a fundamental property of database management systems and is widely supported in single-node databases. As data volumes and workloads exceed the capacity and processing power of a single machine, databases need to scale horizontally across a plurality of nodes. A transaction is considered distributed when it accesses and modifies two or more data items located on separate nodes and managed by different resource managers. Supporting ACID-compliant distributed transactions is challenging because, in distributed environments, nodes can fail independently, and one resource manager may not be aware of the failure of another. Despite these challenges, all resource managers must reach a consistent final decision: whether the transaction commits or aborts.

2PC (an abbreviation of a Two-phase Commit protocol) is the most widely used commit protocol for supporting distributed transactions. Conventional systems rely on 2PC or its variants to handle machine failures during the processing of distributed transactions. However, 2PC and its variants require local logs at each node to perform a consistency check and at least two rounds of synchronous writes to data storage at each node when committing a distributed transaction. The complexity of consistency checks increases with the number of nodes, leading to potential inconsistencies and errors. The at least two rounds of synchronous writes lead to increased latency and reduced throughput for each transaction.

SUMMARY OF THE INVENTION

Embodiments of the subject matter described herein generally relate to 1PC (an abbreviation of the One-phase Commit protocol) for distributed transactions, in which a logging operation occurs at a global log to ensures that only valid transactions are committed, thereby maintaining ACID properties even in the presence of failures.

One embodiment provides a computer-implemented system. The computer-implemented system comprises: a plurality of nodes configured to process a distributed transaction, including a transaction coordinator (Tx) and a plurality of transaction participants(CcMap shards); and a global log (Txlog) configured to manage the liveness of the plurality of nodes, wherein the transaction coordinator is configured to: determine, based on the result of a logging operation that occurs at the global log, whether all of the plurality of nodes are ready to proceed with a commit decision; and communicate the commit decision to the plurality of transaction participants if all of the plurality of nodes are ready, or, communicate an abort decision to the plurality of transaction participants if any of the plurality of nodes is not ready.

Another embodiment provides a method implemented at least in part by a computer. The method comprises: receiving a commit request in a distributed transaction processing system that includes a plurality of nodes; determining, based on the result of a logging operation that occurs at a global log, whether all of the plurality of nodes are ready to proceed with a commit decision; and communicating the commit decision to a plurality of transaction participants if all of the plurality of nodes are ready, or, communicating an abort decision to the plurality of transaction participants if any of the plurality of nodes is not ready.

Yet another embodiment provides a computer storage medium having computer-executable instructions. The computer-executable instructions when executed perform actions comprises: receiving a commit request in a distributed transaction processing system that includes a plurality of nodes; determining, based on the result of a logging operation that occurs at a global log, whether all of the plurality of nodes are ready to proceed with a commit decision; and communicating the commit decision to a plurality of transaction participants if all of the plurality of nodes are ready, or, communicating an abort decision to the plurality of transaction participants if any of the plurality of nodes is not ready.

In accordance with embodiments of the subject matter described herein, a logging operation occurs at a global log, ensuring that the transaction coordinator (Tx) and the transaction participants (CcMap shards) are in a consistent state before proceeding with the commit decision. The term "global" refers to the centralized nature of the logging service, which is accessible by all nodes in the transaction system and serves as the authoritative source for the liveness and commit status of transactions. The global log maintains a logging view of the transaction system's state across all nodes, ensuring that transactions are committed or aborted atomically, even in the presence of node failures.

Moreover, the centralized logging service reduces the complexity and overhead associated with maintaining local logs at each node, thereby improving the system's resilience and availability.

In a preferable embodiment, the global log supports one round of synchronous write to stable storage in the global log when committing a distributed transaction. This design minimizes the number of synchronous writes required for transaction commit, thereby reducing latency and improving throughput compared to the conventional two-phase commit (2PC) protocol.

It is to be understood that this Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 is a flow chart illustrating a conventional commit method under 2PC protocol;

DETAILED DESCRIPTION OF EMBODIMENTS

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes but is not limited to." The term "or" is to be read as "and/or" unless the context clearly indicates otherwise. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
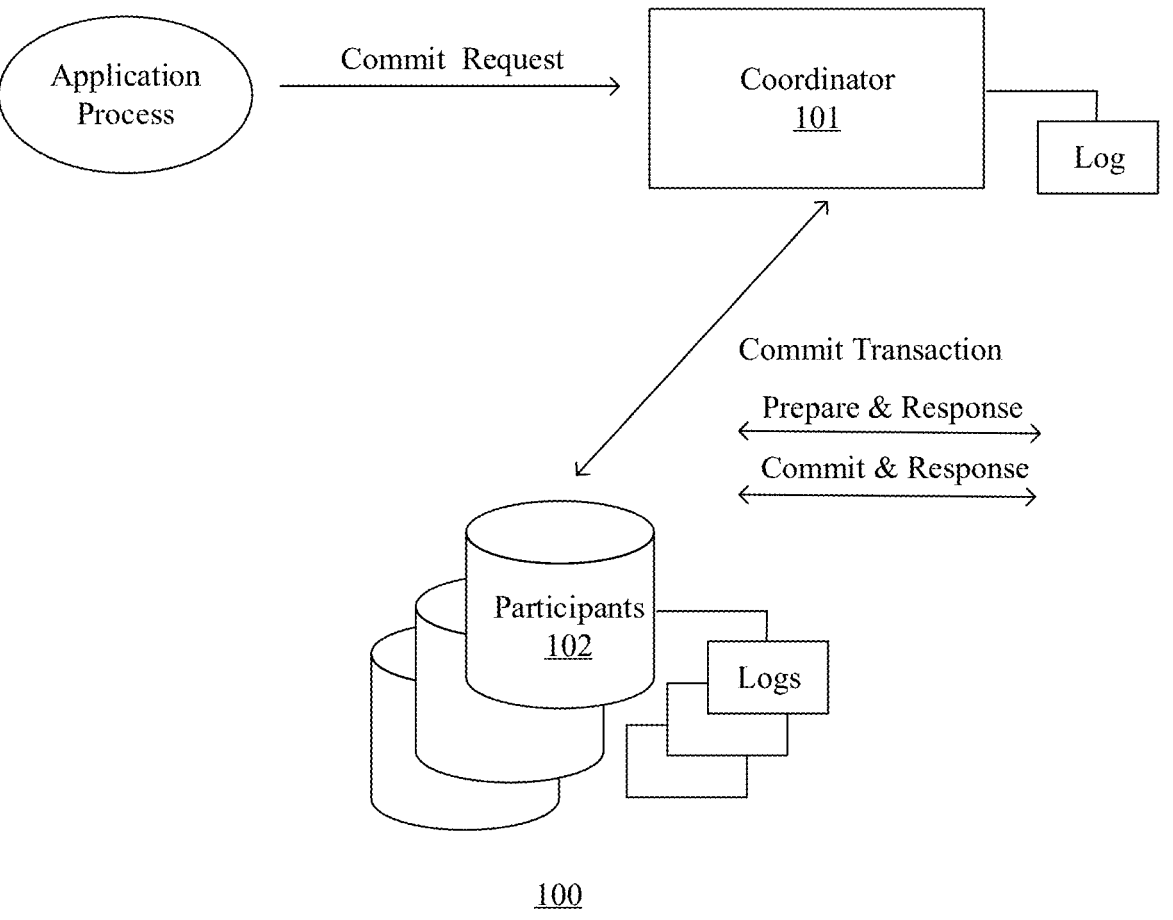
FIG. 1 is a block diagram illustrating a conventional distributed transaction system under 2PC protocol.

FIG. 1 is a block diagram illustrating a conventional distributed transaction system operating under the Two-Phase Commit (2PC) protocol.

The distributed transaction system 100 comprises a coordinator 101 and a plurality of participants 102. In the example of a distributed database system, the coordinator 101 functions as a manager server, while the participants 102 act as data servers. Each of the coordinator 101 and the participants 102 maintains a local log. This local log records transaction details, including transaction identifiers, timestamps, and the state of each transaction (e.g., pending, committed, or aborted). The local log ensures that each participant 102 can independently track the progress and outcome of transactions it is involved in, even if communication with the coordinator 101 is temporarily disrupted.

The coordinator 101 is responsible for managing the transaction process, which includes a prepare phase and a commit phase. Each of the participants 102 manages its local data item and its concurrency control state.

In the prepare phase, the coordinator 101 sends a prepare request to all participants 102. Upon receiving affirmative responses, it sends a commit request. If any participant 102 responds negatively or fails to respond, the coordinator 101 sends an abort request to all participants 102. This process ensures that all participants 102 are in a consistent state before the final commit or abort decision is made, but it introduces significant overhead due to a plurality of rounds of synchronous writes and state persistence.

Figure 2:
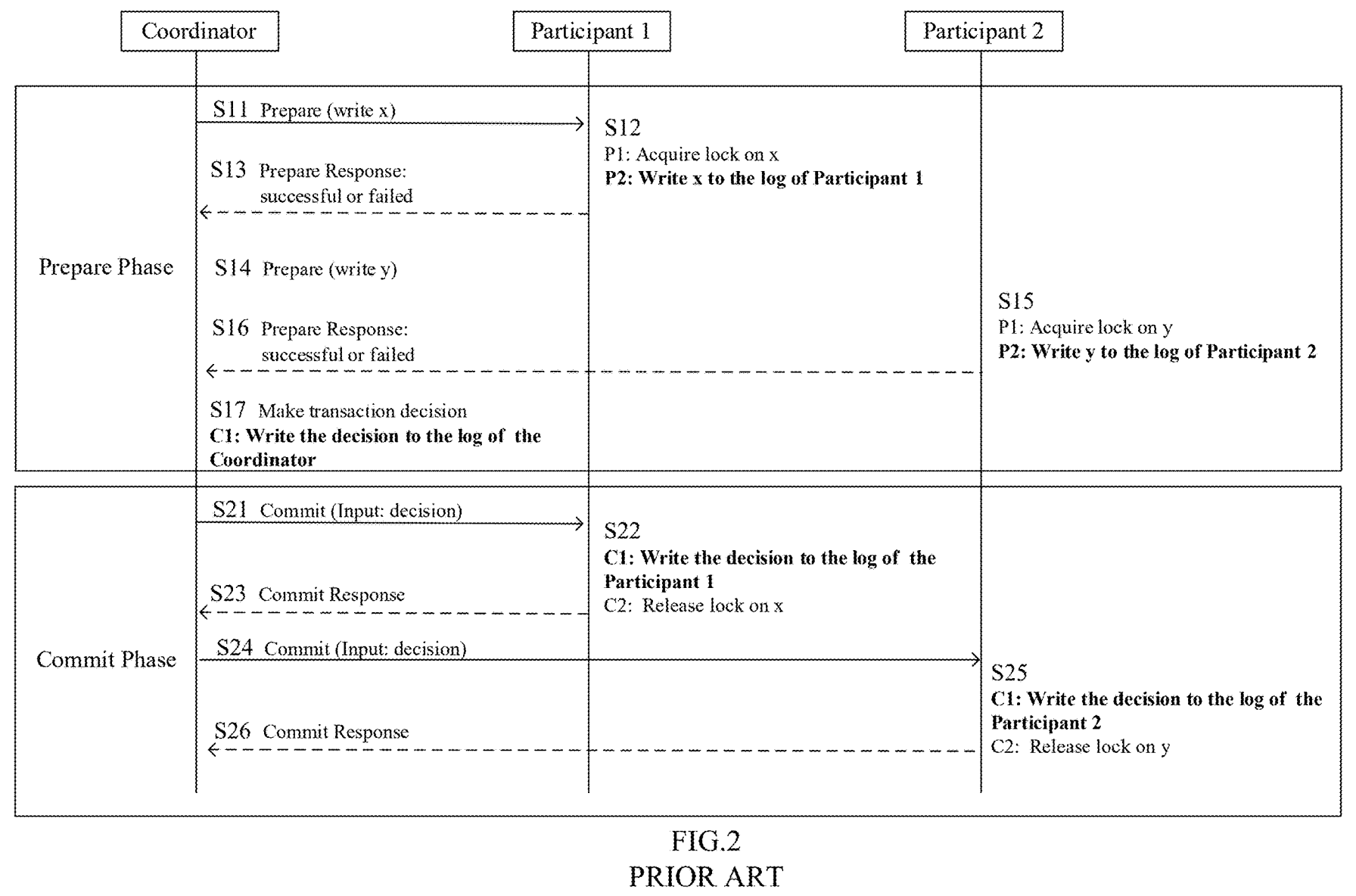

FIG. 2 illustrates a flowchart of a conventional commit method under the 2PC protocol. Here, the distributed transaction system includes one coordinator 101 and two participants, 102_1 and 102_2, but the present disclosure is not limited thereto. There may be more participants in the distributed transaction system.

When an application process submits a commit request, the coordinator 101 responds in two phases: a prepare phase and a commit phase, with two rounds of synchronous writes. In the example of a distributed database system, the commit request may involve updating data records across a plurality of data servers, but the present disclosure is not limited thereto. Here, the commit request involves writing data items (x, y) across the two participants 102_1 and 102_2.

The prepare phase includes the following steps S11-S17, where the coordinator 101 sends prepare requests to both participants 102_1 and 102_2 and makes a decision based on their prepare responses.

In step S11, the coordinator 101 sends a first prepare request to participant 102_1. Participant 102_1 receives a first data item (x) necessary for the transaction.

In step S12, participant 102_1 responds to the prepare request by locking the resources for the first data item (x) and writing the first data item (x) to its local log to ensure durability. In this step, participant 102_1 checks for any conflicts. For example, a conflict occurs if the locked data item (x) is already involved in another uncommitted transaction or if concurrent access requests from other transactions would violate isolation or consistency constraints.

In step S13, participant 102_1 sends a first prepare response to the coordinator 101. The first prepare response indicates whether participant 1021 has successfully prepared the transaction, including whether it has locked the necessary resources and written the data item (x) in its local log without encountering any conflicts or errors.

Further, in steps S14-S16, the procedure of steps S11-S13 is repeated for participant 102_2. Participant 102_2 locks the necessary resources for a second data item (y) and writes the second data item (y) in its local log. The coordinator 101 receives a second prepare response from participant 102_2.

In step S17, the coordinator 101 makes a transaction decision according to prepare responses of participants 102_1 and 102_2. In a case where both participants 102_1 and 1022 respond affirmatively, the transaction decision is a commit decision. If any participant responds negatively or fails to respond, the transaction decision is an abort decision.

The transaction decision is recorded in the local log of the coordinator 101.

Furthermore, the coordinator 101 proceeds to the commit phase.

The commit phase includes the following steps S21-S27, where the coordinator 101 sends commit requests with the transaction decision to both participants 102_1 and 102_2 so that they release the resources for the data items (x, y) and process the data items (x, y) according to the transaction decision.

In step S21, the coordinator 101 notifies participant 102_1 of the transaction decision.

In step S22, participant 102_1 writes the decision into its local log. If the transaction decision is a commit decision, participant 102_1 releases the resources for the first data item (x) and applies the changes. If the decision is an abort decision, participant 102_1 releases the resources without applying the changes, ensuring that no modifications are visible to other transactions.

In step S23, participant 102_1 sends a first commit response to the coordinator 101. The first commit response indicates whether the commit decision or abort decision has been successfully applied.

Further, in steps S24-S26, the procedure of steps S21-S23 is repeated for participant 102_2. Participant 102_2 processes the data items (y) according to the transaction decision. The coordinator 101 receives a second commit response from participant 102_2.

In the above conventional distributed transaction system under 2PC protocol, each node of the system maintains a local log. Each of the participants 102_1 and 102_2 performs at least two rounds of synchronous writes into stable storage: 1) persisting a data item (x, y) as a log record at the request phase, and 2) persisting a decision (commit or abort)

as a log record at the commit phase. Each round of synchronous write is slow, and the two rounds of synchronous writes must occur in sequence, further exacerbating the latency and reducing the overall throughput of the system. Consequently, the conventional 2PC protocol is known to be costly.

Figure 3:
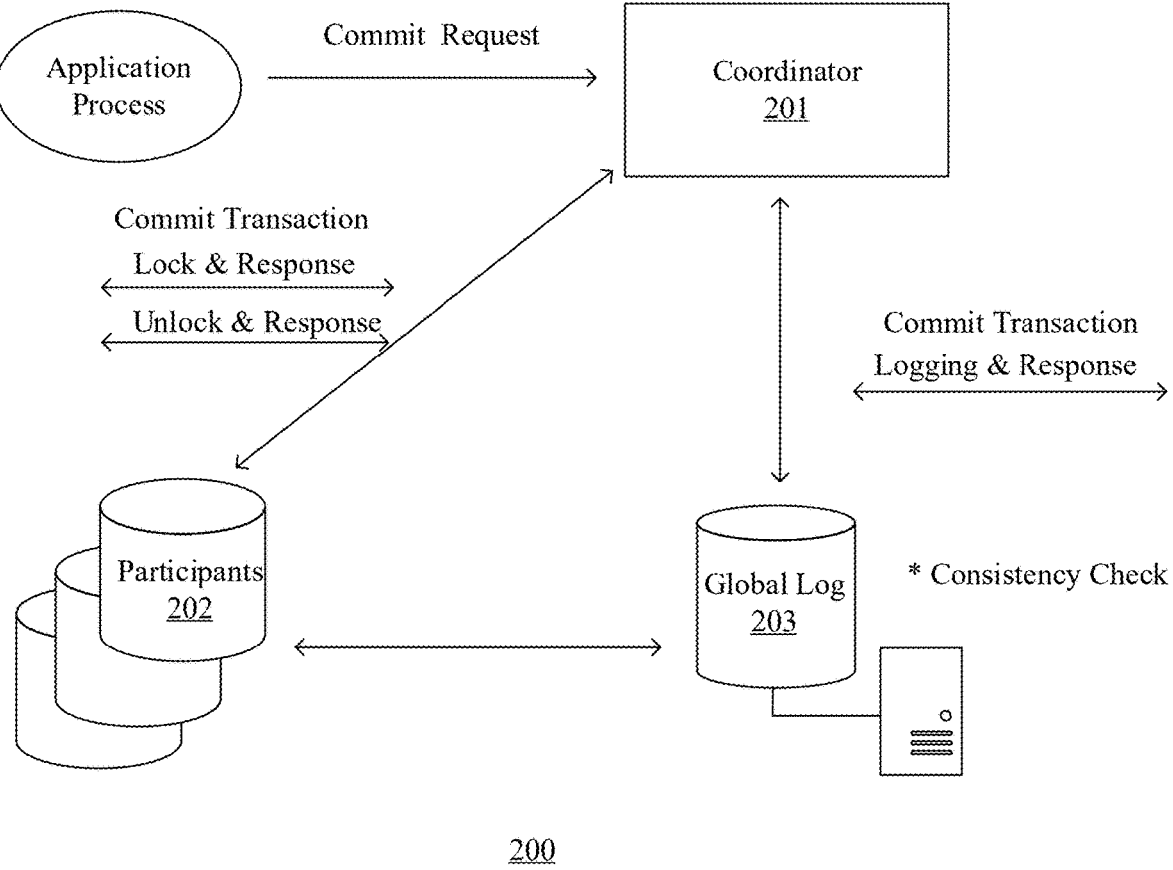
FIG. 3 is a block diagram illustrating a distributed transaction system under 1PC protocol according to an embodiment of the present disclosure.

FIG. 3 is a block diagram illustrating a distributed transaction system under 1PC protocol according to an embodiment of the present disclosure.

The distributed transaction system 200 comprises a coordinator 201 and a plurality of participants 202. All of the coordinator 201 and the participants 202 share a global log 203. The global log 203, referred to as Txlog, is a centralized and persistent store that manages liveness of all nodes and all data items of the transaction across all nodes.

The distributed transaction system 200 may be any of a distributed database system, a distributed file system, a distributed caching system, and a distributed message queue system. In the example of the distributed database system, the coordinator 201 functions as a manager server, while the participants 202 act as data servers.

The coordinator 201 is responsible for managing the transaction process, which in the 1PC protocol, consists of a single commit phase.

During the commit phase, the transaction coordinator 201 (Tx) interacts with the global log 203 (Txlog) to perform logging operations, including stable storage and consistency check. The logging operations occur at the global log 203 (Txlog), so that all data items of a commit request persisted into the global log 203 (Txlog), and a consistency check for all nodes of the distributed transaction system is made at the global log 203 (Txlog). This eliminates the need for each participant 202 to maintain its local data items and concurrency control state, significantly reducing the overhead associated with local state persistence. By centralizing the logging and consistency checks, the 1PC protocol ensures that the transaction coordinator and participants can quickly and reliably determine the liveness and commit status of transactions, even in the presence of node failures. This approach not only simplifies the recovery process but also enhances the system's performance and availability.

Figure 4:
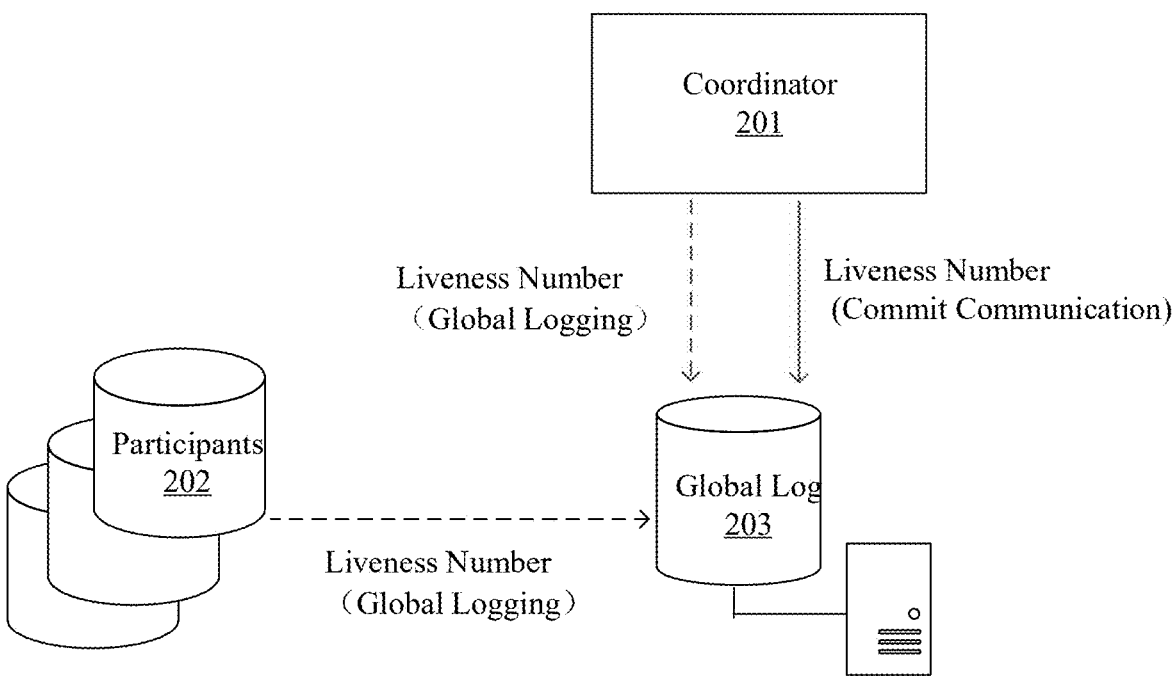
FIG. 4 illustrates an example of global consistency check that occurs at the global log in the distributed transaction system shown in FIG. 3.

As shown in FIG. 4, all nodes of the distributed transaction system, including the coordinator 201 and the participants 202, sends a liveness number to the global log 203 through a non-critical path (dashed line), each time it fails over to a new node or restarts. Thus, the global log 203 has stored the liveness numbers of all nodes before the commit phase.

During the commit phase, the coordinator 201 sends a logging request to the global log 203, with the new liveness numbers of all nodes, through a critical path (solid line) under a commit protocol. The consistency check is performed by verifying the liveness of all nodes by comparing new liveness numbers with previous liveness numbers having stored in the global log 203, and the result of the logging operation is a check flag of the consistency check.

The term "liveness number" refers to a unique identifier that indicates the current active state of a node. In one embodiment, the liveness number may be a node group term managed by a distributed consensus protocol (e.g., Raft or Paxos) to identify the active leader in a node group. Alternatively, the liveness number may be a unique number assigned by a liveness oracle after a node successfully recovers from a failure. The liveness number ensures that only valid and live nodes participate in the transaction.

The term "critical path" refers to the sequence of operations initiated by a commit request that must complete in a specific order for the transaction to commit (e.g., when sending liveness numbers to the global log during the commit phase). The term "non-critical path" includes asynchronous operations (e.g., when updating liveness numbers during node restart) that do not block the transaction's progress.

Figure 5:
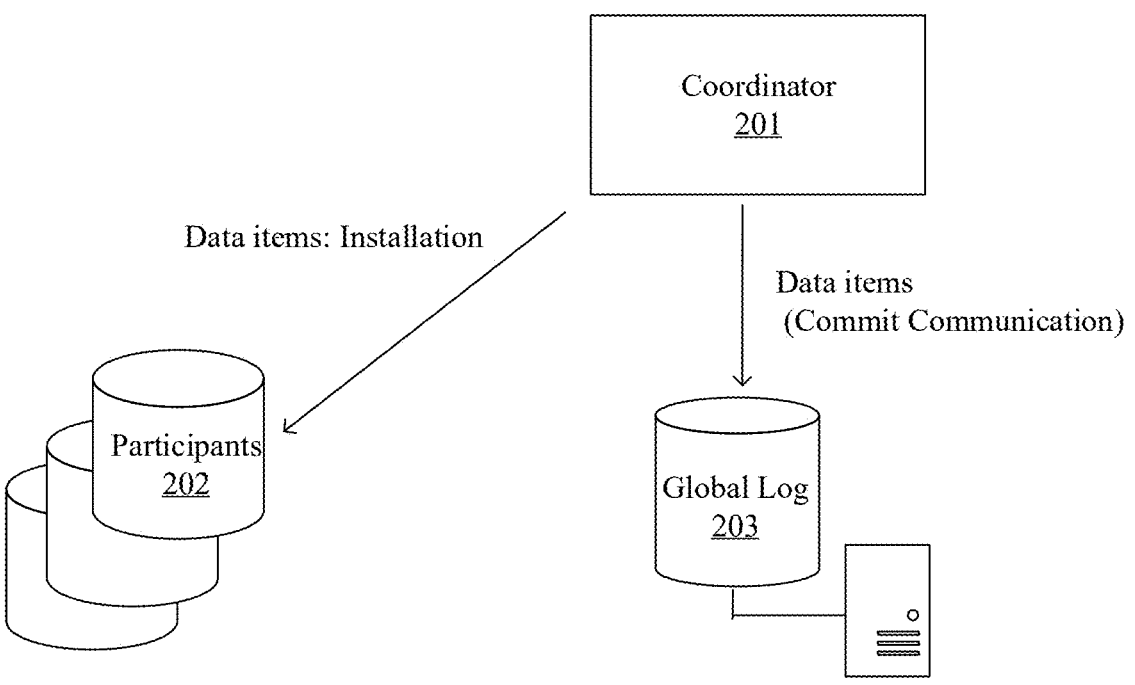
FIG. 5 illustrates an example of global synchronous write that occurs at the global log in the distributed transaction system shown in FIG. 3.

As shown in FIG. 5, during the commit phase, the coordinator 201 sends a logging request to the global log 203, with the date items of all participants 202. The stable storage is performed by persisting the data items into the global log 203. The global log 203 then returns a write flag to the coordinator 201, indicating the success or failure of the logging operation.

The stable storage in the global log (Txlog) ensures durability by persisting data items (x, y) and returning a write flag to indicate success/failure. This eliminates the need for participants to perform local stable storage writes.

During the commit phase, the coordinator 201 makes a transaction decision according to the response of the logging operation. If both of the check flag of the consistency check and the write flag of the stable storage are affirmative, the coordinator 201 communicates a commit decision to all participants 202, instructing them to release the locks on the data items and install the changes. If any of the check flag of the consistency check and the write flag of the stable storage is negative, the coordinator 201 communicates an abort decision to all participants 202, instructing them to release the locks on the data items without applying the changes.

A key feature of the distributed transaction system 200 is to separate the logging system from the coordinators and the participants. In this system, the global logger holds the truth of the state of the system and determines a transaction's status. Both participants and coordinators leverage the global logging service for recovery.

The coordinator 201 may contain a transaction state machine Tx. When the coordinator 201 receives requests from the application process, the transaction state machine Tx maintains the transaction's private states, such as the read-set, the write-set, the commit timestamp and the transaction's status. The transaction state machine Tx by itself is stateless. Instead, the transaction state machine Tx interacts with other nodes of the distributed transaction system 200 to execute a transaction from the start to end.

Each of the participants 202 may contains an in-memory map CcMap shard. A CcMap maps a key k to a tuple:

ccMap: (k)→( meta–data, val, cTs )

where the key k is the identifier of a data item. Each map entry has fields to keep track of the k's newest value val and its commit timestamp cTs. It also contains a meta-data field. Meta-data in the tuple are data structures for concurrency control, such as the read and write lock on the data item, the blocking queue, the last read timestamp for k. The details of meta-data depend on the concurrency control protocol.

The global log 203 may contain a replicated state machine (RSM). This RSM is designed to maintain a consistent and durable record of all transactions across the distributed system. Each log entry in the RSM includes a transaction number txn, a commit timestamp commitTs, and a set of modified keys and values change set, which consists of the modified keys and their new values. Operations toward the RSM are first persisted in a log file and then applied to the RSM in order.

The replicated state machine (RSM) in the global log (Txlog) maintains a consistent record of all transactions. Each log entry may include:

a transaction identifier ('txn'), a commit timestamp ('commitTs'), a set of modified keys/values ('change set'), node group terms ('tx_term', 'shard_term') for liveness validation.

In a lock operation, the coordinator 201 acquires write lock of k from one of the participants 202. The lock response includes a lock flag and a leader term shard_term of the node group to which the one of the participants 202 is bound, ccMap.Acquire(k, txn, tx_term)→<bool, commitTs, last-ReadTs, shard_term)

In a logging operation, the coordinator 201 persists date items of a commit request in a log file of the global log 203. Moreover, the coordinator 201 sends a leader term tx_term of the node group to which the coordinator 201 is bound, and the leader terms shard_term of the participants 202 to the global log 203. A log entry is appended to the global log 203:

Txlog.Append( . . . , tx_sid, tx_term, map(sid)→ shard_term)→bool where tx_sid is the unique identifier of the transaction, tx_term is the leader term of the node group to which the transaction coordinator 201 is bound, and map(sid)→shard_term is a mapping of the participant's shard ID to the leader term of the node group to which the participant is bound.

If there is a term mismatch for the transaction coordinator 201 or any participant 202, the state machine rejects the transaction, and the Txlog.Append( ) operation returns false. Only if all node group terms match, the log record is appended to the log queue in the state machine, and Txlog.Append( ) operation returns true.

In an unlock operation, the coordinator 201 notifies each of the participants 202 to release write lock of k. In each of the participants 202, the k's node group term in the write-set is passed in the CcMap.PostProcess( ) request.

CcMap.PostProcess(k, . . . , WS(k).term)→void where WS(k) is the write-set entry for key k, and the term is the leader term of the node group to which the participant is bound.

In the protocol, the 1 of in-memory states—Tx and locks—is identified by node group terms. A term is obtained the first time a state is accessed, e.g., acquire a lock. It is checked when the state is re-accessed, e.g., release a lock. Getting and checking terms are piggybacked on concurrency control requests and therefore incur no additional cost. The log state machine grants a transaction's commitment only if the log record is persisted and the transaction's related in-memory states are validated.

Figure 6:
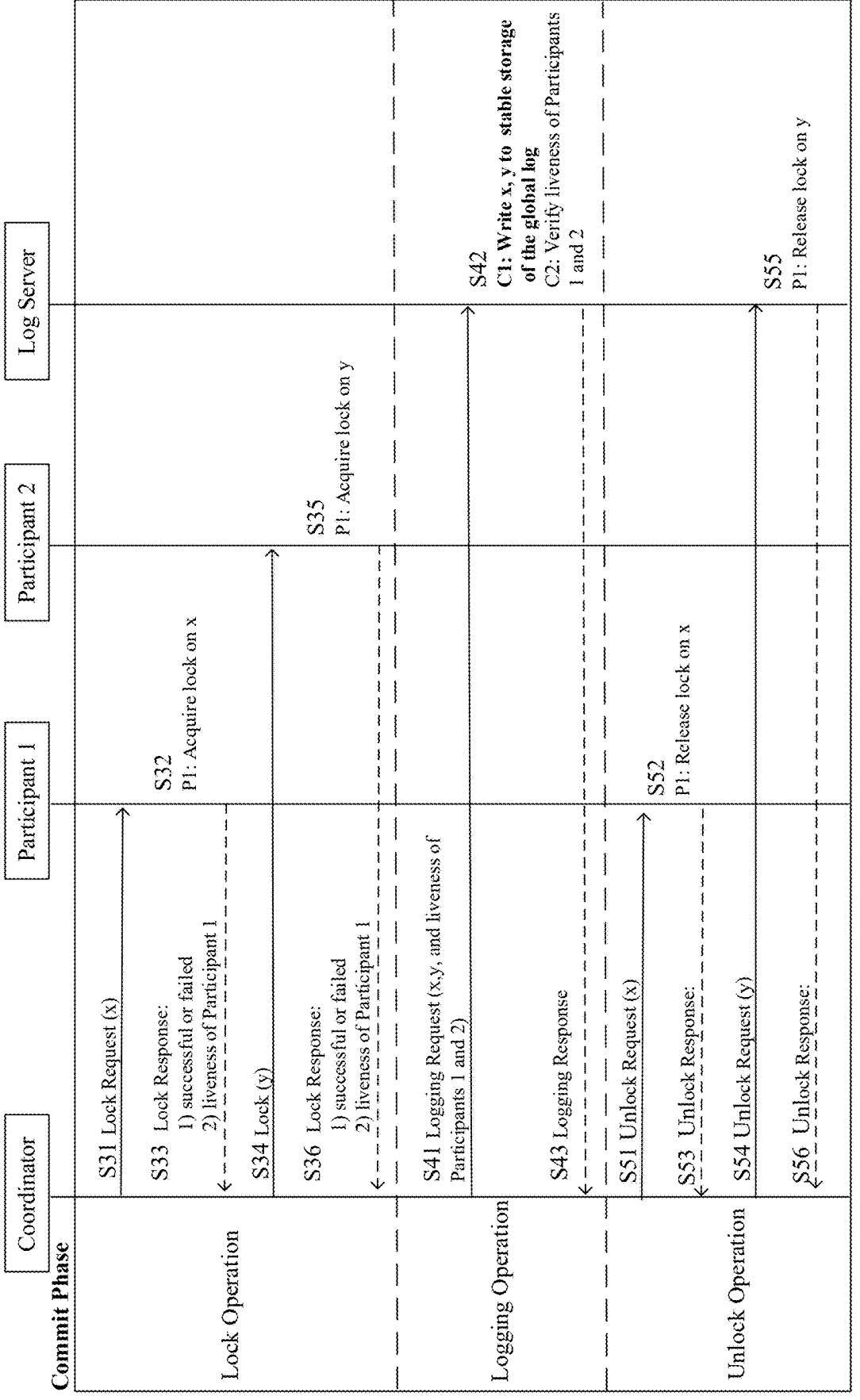
FIG. 6 is a flow chart illustrating a commit method under 1PC protocol according to an embodiment of the present disclosure.

FIG. 6 is a flow chart illustrating a commit method under 1PC protocol according to an embodiment of the present disclosure. Here, the distributed transaction system includes one coordinator 201 two participants, 202_1 and 202_2, and a global log 203, but the present disclosure is not limited thereto. There may be more participants in the distributed transaction system.

When an application process submits a commit request, the coordinator 201 responds in a single commit phase which is further divided into three operations: a lock operation, a logging operation and an unlock operation, with only a single round of synchronous write. In the example of a distributed database system, the commit request may involve updating data records across a plurality of data servers, but the present disclosure is not limited thereto.

Here, the commit request involves writing data items (x, y) across the two participants 202_1 and 202_2.

The lock operation includes the following steps S31-S36, where the coordinator 201 sends lock requests to both participants 202_1 and 202_2 to acquire write locks for the data items (x, y).

The lock operation ensures that each participant (e.g., 2021, 202_2) acquires a write lock for its respective data item (x, y) and responds with a lock flag (indicating success/ failure) and its liveness number (e.g., a node group term). If the lock fails, the coordinator may abort the transaction.

Different from the prepare phase in a conventional method under 2PC protocol, the lock operation in the 1PC protocol does not require the participants 202_1 and 202_2 to persist the data items (x, y) to stable storage.

In step S31, the coordinator 201 sends a first lock request to participant 202_1.

In step S32, the participant 202_1 locks the resources for the first data item (x).

In step S33, the participant 202_1 responds to the coordinator 201 with a lock flag and a leader term of the node group to which it is bound. The lock flag indicates whether the lock for the first data item (x) was successfully acquired. If the lock is successfully acquired, the participant 202_1 also returns the commit timestamp (commitTs) and the last read timestamp (lastReadTs) of the first data item (x). These timestamps are used by the coordinator 201 to ensure that the transaction can proceed without conflicts. If the lock cannot be acquired, the participant 202_1 returns a negative lock flag, and the coordinator 201 may decide to abort the transaction.

Further, in steps S34-S36, the procedure of steps S31-S33 is repeated for participant 202_2. Participant 202_2 locks the necessary resources for the second data item (y) and responds to the coordinator 201 with a lock flag and the leader term of its node group.

The logging operation includes the following steps S41-S43, where the coordinator 201 interacts with the global log 203 to persist the transaction's data items and verify the liveness of the transaction coordinator and participants. This operation is critical for maintaining the ACID properties of the transaction, even in the presence of failures.

In step S41, the coordinator 201 sends a logging request to the global log 203, including the transaction identifier (tx_sid), the leader term of the node group to which the coordinator 201 is bound (tx_term), and the mapping of the participant's shard ID to the leader term of the node group to which the participant is bound (map(sid)→shard_term). The logging request also includes the data items (x, y) and their corresponding commit timestamps and last read timestamps obtained during the lock operation.

In step S42, the global log 203 performs a consistency check by verifying the liveness of the coordinator 201 and the participants 202_1 and 202_2. The consistency check involves comparing the new liveness numbers (leader terms) with the previous liveness numbers stored in the global log 203. If there is a term mismatch for the coordinator 201 or any participant 202, the global log 203 rejects the transaction, and the Txlog.Append( ) operation returns false. If all node group terms match, the global log 203 appends the log record to the log queue in the state machine, and Txlog.Append( ) operation returns true.

In step S43, the coordinator 201 receives the result of the logging operation from the global log 203. If the result of the logging operation is affirmative (i.e., the global log 203 returns true), the coordinator 201 makes a commit decision.

If the result of the logging operation is negative (i.e., the global log 203 returns false), the coordinator 201 makes an abort decision.

The unlock operation includes the following steps S51-S55, where the coordinator 201 communicates the commit or abort decision to the participants 202_1 and 202_2. This operation ensures that the locks on the data items (x, y) are released, and the changes are either installed or discarded, maintaining the ACID properties of the transaction.

Different from the commit phase in a conventional method under 2PC protocol, the unlock operation in the 1PC protocol does not require the participants 202_1 and 202_2 to persist the transaction decision to stable storage.

In step S51, the coordinator 201 notifies participant 202_1 of the transaction decision. This notification includes the commit or abort decision, which instructs participant 202_1 on how to proceed with the transaction. If the decision is a commit, participant 202_1 releases the write lock on the first data item (x) and applies the changes, making the new value visible to other transactions. If the decision is an abort, participant 202_1 releases the write lock without applying the changes, ensuring that no modifications are visible to other transactions.

In step S52, participant 202_1 processes the transaction decision. It writes the decision into its local log, but this write is asynchronous and does not block the transaction's progress. This ensures that the transaction can complete quickly, even if the local log write is delayed.

In step S53, participant 202_1 sends a commit response to the coordinator 201, indicating whether the commit or abort decision has been successfully applied. The commit response includes a confirmation flag and the leader term of the node group to which participant 202_1 is bound.

Further, in steps S54-S55, the procedure of steps S51-S53 is repeated for participant 202_2. Participant 202_2 processes the data item (y) according to the transaction decision, and the coordinator 201 receives a second commit response from participant 202_2. This ensures that both participants 202_1 and 202_2 are in a consistent state, either committing or aborting the transaction, and that the locks on the data items (x, y) are released appropriately. By centralizing the logging and consistency checks, the 1PC protocol minimizes the number of synchronous writes required, thereby reducing latency and improving throughput compared to the conventional 2PC protocol.

In the above embodiments, the consistency check is described with an example of checking node group terms to which the nodes of the distributed transaction system are bound. By verifying the node group terms of the nodes through these terms, the system can prevent orphan locks and ensure that transactions are only committed if all involved nodes are in a consistent and valid state. Nevertheless, the present disclosure is not limited thereto. Other mechanisms for ensuring consistency and liveness can be employed, such as unique numbers of the nodes of the distributed transaction system, each of which is assigned to a node by a liveness oracle, after successful recovery of the node.

Figure 7:
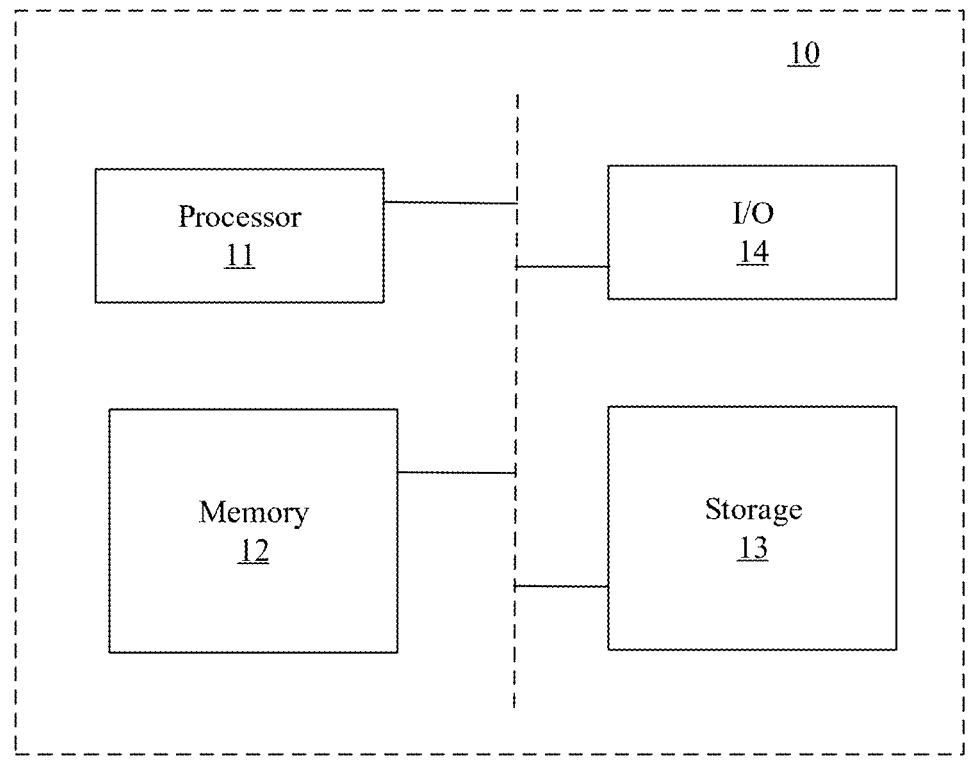
FIG. 7 is a block diagram illustrating a computer-implemented system in which the subject matter described herein may be implemented.

FIG. 7 is a block diagram illustrating a computer system in which the subject matter described herein may be implemented. The computer system may be applicable for the coordinator, participants, and the global log.

The computer system 10 includes at least a processor 11, a memory 12, a storage 13, and an input/output (I/O) interface 14.

The processor 11 serves as the central processing unit of the system, responsible for executing instructions and performing computations. It can be a single—core or multi-core processor, designed to handle various tasks efficiently.

The memory 12 provides storage for data and program instructions that the processor needs to access quickly. It can include volatile memory like RAM (which loses data when power is removed) and non—volatile memory such as ROM (which retains data without power).

The storage 13 offers a more permanent data—retention solution. Unlike memory, storage devices retain data even when the system is powered off. This component can consist of various storage media, such as hard disk drives (HDDs), solid—state drives (SSDs), or hybrid drives. HDDs provide large storage capacities at a relatively low cost, suitable for storing large amounts of data. SSDs, in contrast, have faster read and write speeds, leading to quicker boot times, faster application launches, and enhanced overall system performance. Some computer systems may also have optical drives (e.g., DVD or Blu—ray drives) for reading and writing optical media, though they are less common in modern systems.

The I/O interface 14 enables the computer system to communicate with external devices. It can support various connections, such as USB ports for peripherals like keyboards and mice, network interfaces for internet connection, and display interfaces for outputting graphics to monitors.

Computer storage medium refers to any available storage media accessible within a computer system. For example, in the computer system 10, the computer storage medium may include memory 12, storage 13, or a combination of both.

Embodiments of the subject matter can be described in the context of computer-executable instructions (such as those in program modules) being executed in a computing environment on a target real or virtual processor. Generally, program modules include routines, programs, libraries, objects, classes, components, data structures, etc., which perform specific tasks or implement specific abstract data types. The functionality of program modules can be combined or divided as needed in different embodiments.

Computer—executable instructions for program modules can be executed in a local or distributed computing environment. In a distributed computing environment, program modules may be located in both local and remote computer storage media.

In the context of the 1PC protocol, the global log (Txlog) is designed to handle high transaction volumes with minimal latency and high throughput. The centralized logging and consistency checks reduce the overhead of local state persistence, making the 1PC protocol particularly suitable for distributed database environments where performance and availability are critical.

In the same field of the endeavor, most prior arts are primarily optimizations or extensions of the 2PC protocol, focusing on reducing network messages or handling specific transaction types. An Invariant in 2PC is that Participants persist prepare log records before replying to the coordinator during the first phase. This ensures reliability by allowing recovery if a participant crashes after preparing but before committing. The second phase, commit phase, involves participants persisting commit logs, which can vary in implementation-either handled by the coordinator or participants.

Contrast to the forementioned 2PC protocol, the 1PC method steps disclosed in the present invention does not require participants to log during the commit phase. This offers advantages such as reduced overhead and improved efficiency but may involve alternative mechanisms for handling tradeoffs.

The system and method described herein can be implemented in various computing environments, including cloud computing platforms, on-premises data centers, and hybrid environments. The global log (Txlog) can be deployed as a distributed service across multiple nodes to ensure high availability and fault tolerance.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented system, comprising:
a plurality of nodes configured to participate in processing a distributed transaction, the plurality of nodes including
a transaction coordinator (Tx), and
a plurality of transaction participants (CcMap shards); and
a global log (Txlog) configured to serve as a centralized authority for managing liveness of the plurality of nodes,
wherein the transaction coordinator (Tx) is configured to:
perform a single logging operation at the global log (Txlog);
determine, based on the result of a single logging operation whether all of the plurality of nodes, participated in distributed transaction, are ready to proceed with a commit decision; and
communicate:
a final commit decision to the plurality of transaction participants when the global log(Txlog) confirms that all of the plurality of nodes are ready; or,
an abort decision to the plurality of transaction participants when the global log (Txlog) indicates that any of the plurality of nodes is not ready;
wherein the liveness of each of the plurality of nodes identifies an operational lifetime of the corresponding node within the computer-implemented system, and is characterized by a unique liveness number;
wherein global in global log (Txlog) denotes the centralized nature of the TxLog logging service, which is accessible by all nodes in the transaction system and serves as the authoritative source for the each node liveness and transaction commit status, the global log maintains a unified system-wide view of transaction state across all nodes, to ensure commit or aborted atomically, even in the presence of node failures, and wherein the centralized logging service reduces the complexity and overhead associated with maintaining local logs at each individual node, thereby improving the system's resilience and availability.

2. The system according to claim 1, wherein the logging operation comprises
at least one of consistency check and data storage.

3. The system according to claim 2, wherein
the consistency check is performed
by comparing new liveness numbers with previous liveness numbers having stored in the global log to verify liveness of the plurality of nodes; and wherein
the result of the logging operation is a check flag representing an outcome of the consistency check.

4. The system according to claim 3, wherein
the liveness number is a node group term, which is managed by a distributed consensus protocol (such as Raft or Paxos) and
is used to identify the active state of the current leader in a node group.

5. The system according to claim 4, wherein
the transaction coordinator sends liveness numbers of the plurality of nodes to the global log through a critical path under a commit protocol, and
each of the plurality of nodes sends a new liveness number to the global log through a non-critical path, each time it fails over to a new node or restarts.

6. The system according to claim 3, wherein
the liveness number is a unique number, which is assigned to a node by a liveness oracle, after successful recovery of the node.

7. The system according to claim 2, wherein
the global log (Txlog) is configured to persist data items of a commit request into a stable storage of the global log, and
the result of the logging operation is a write flag of the data items.

8. The system according to claim 1, wherein
each transaction participant of the plurality of nodes is configured to lock respective one of the data items and
respond with a lock flag and a new liveness number of the node to the transaction coordinator, before the logging operation.

9. The system according to claim 8, wherein
each transaction participant of the plurality of nodes is configured to
release the lock on the respective one of the data items after installing the data items upon receiving the commit decision.

10. The system according to claim 8, wherein
each transaction participant of the plurality of nodes is configured to
release the locks on the respective one of data items without installing the data items upon receiving the abort decision.

11. A method implemented at least in part by a computer comprising:
receiving a commit request in a distributed transaction processing system that includes a plurality of nodes;
determining, based on a result of a logging operation that occurs at a global log, whether all of the plurality of nodes are ready to proceed with a commit decision; and
communicating a commit decision to a plurality of transaction participants if all of the plurality of nodes are ready; or,
communicating an abort decision to the plurality of transaction participants if any of the plurality of nodes is not ready,
identifying an operational lifetime of each of the plurality of nodes within the computer-implemented system by a unique liveness number;
wherein global log (Txlog) denotes the centralized nature of the TxLog logging service, which is accessible by all nodes in the transaction system and serves as the authoritative source for the each node liveness and transaction commit status, the global log maintains a unified system-wide view of transaction state across all nodes, to ensure commit or aborted atomically, even in the presence of node failures, and wherein the centralized logging service reduces the complexity and overhead associated with maintaining local logs at each individual node, thereby improving the system's resilience and availability.

12. The method according to claim 11, wherein the logging operation comprises at least one of consistency check and data storage.

13. The method according to claim 12, wherein the consistency check is performed by comparing new liveness numbers with previous liveness numbers stored in the global log to verify liveness of the plurality of nodes, and wherein the result of the logging operation is a check flag representing an outcome of the consistency check.

14. The method according to claim 13, wherein the liveness number is a node group term, which is managed by a distributed consensus protocol (such as Raft or Paxos) and is used to identify the active state of the current leader in a node group.

15. The method according to claim 14, wherein the transaction coordinator sends liveness numbers of the plurality of nodes to the global log through a critical path of a commit protocol, and each of the plurality of nodes sends new liveness number to the global log through a non-critical path, each time it fails over to a new node or restarts.

16. The method according to claim 13, wherein the liveness number is a unique number which is assigned to a node by a liveness oracle, after successful recovery of the node.

17. The method according to claim 12, wherein the global log (Txlog) is configured to persist data items of the commit request into a stable storage of the global log, and the result of the logging operation is a write flag of the data items.

18. The method according to claim 11, further comprising each transaction participant of the plurality of nodes locking respective one of the data items and responding with a lock flag and a new liveness number of the node to the transaction coordinator, before the logging operation.

19. The method according to claim 18, further comprising, each transaction participant of the plurality of nodes releasing the locks on the data items after installing the data items upon receiving the commit decision.

20. The method according to claim 18, further comprising each transaction participant of the plurality of nodes releasing the locks on the data items without installing the data items upon receiving the abort decision, after the step of logging operation.

* * * * *